United States Patent
Raza et al.

(10) Patent No.: US 10,594,588 B2
(45) Date of Patent: *Mar. 17, 2020

(54) BUILT IN ALTERNATE LINKS WITHIN A SWITCH

(71) Applicant: Fiber Mountain, Inc., Cheshire, CT (US)

(72) Inventors: Mohammad H Raza, San Jose, CA (US); David G Stone, Irvine, CA (US); Aristito Lorenzo, Plantsville, CT (US); Ronald M. Plante, Prospect, CT (US); John R. Lagana, West Nyack, NY (US)

(73) Assignee: FIBER MOUNTAIN, INC., Cheshire, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,644

(22) Filed: Apr. 29, 2019

(65) Prior Publication Data

US 2019/0253336 A1   Aug. 15, 2019

Related U.S. Application Data

(63) Continuation of application No. 14/671,263, filed on Mar. 27, 2015, now Pat. No. 10,277,496.

(60) Provisional application No. 61/972,121, filed on Mar. 28, 2014.

(51) Int. Cl.
*H04L 12/26* (2006.01)
*H04L 12/931* (2013.01)

(52) U.S. Cl.
CPC ............ *H04L 43/50* (2013.01); *H04L 49/208* (2013.01)

(58) Field of Classification Search
CPC ................................................... H04L 43/50
See application file for complete search history.

(56) References Cited

U.S. PATENT DOCUMENTS

| | | | |
|---|---|---|---|
| 5,101,151 | A | 3/1992 | Beaufils |
| 5,457,556 | A | 10/1995 | Shiragaki |
| 5,493,565 | A | 2/1996 | Hanson |
| 5,838,681 | A | 11/1998 | Bonomi |
| 5,892,770 | A | 4/1999 | Wolf |
| 6,067,585 | A | 5/2000 | Hoang |
| 6,188,702 | B1 | 2/2001 | Tornetta |
| 6,243,510 | B1 | 6/2001 | Rauch |
| 6,873,229 | B2 | 12/2005 | Tzathas |
| 6,980,725 | B1 | 12/2005 | Swieconek |

(Continued)

FOREIGN PATENT DOCUMENTS

WO   2013171042   11/2013

OTHER PUBLICATIONS

Examination Report mailed in Australian Application 2015237261 dated May 10, 2018.

(Continued)

*Primary Examiner* — Yemane Mesfin
*Assistant Examiner* — Henry Baron
(74) *Attorney, Agent, or Firm* — Wissing Miller LLP

(57) ABSTRACT

The network switch architecture permits modifications to the network topology in real time without the need for manual intervention. In this architecture, a switching core is capable of switching data paths directly from the ingress or egress of the switching core to alternate destination ports in real time, either under software or hardware control.

19 Claims, 11 Drawing Sheets

(56) References Cited

U.S. PATENT DOCUMENTS

| | | |
|---|---|---|
| 7,226,217 B1 | 6/2007 | Benton |
| 7,277,425 B1 | 10/2007 | Sidkar |
| 7,492,714 B1 | 2/2009 | Liao |
| 7,606,492 B2 | 10/2009 | Farmer |
| 7,606,494 B1 | 10/2009 | Weston-Dawkes |
| 7,772,975 B2 | 8/2010 | Downie |
| 7,782,202 B2 | 8/2010 | Downie |
| 7,912,091 B1 | 3/2011 | Krishnan |
| 7,965,186 B2 | 6/2011 | Downie |
| 8,138,925 B2 | 3/2012 | Downie |
| 8,264,366 B2 | 9/2012 | Chamarti |
| 8,421,626 B2 | 4/2013 | Downie |
| 9,159,012 B2 | 10/2015 | Downie |
| 9,237,034 B2 * | 1/2016 | Huang ............ G06F 11/2005 |
| 2001/0015839 A1 | 8/2001 | Koh |
| 2003/0026205 A1 | 2/2003 | Mullendore |
| 2003/0030866 A1 | 2/2003 | Yoo |
| 2004/0029417 A1 | 2/2004 | Engel |
| 2006/0018329 A1 | 1/2006 | Nielsen |
| 2006/0148279 A1 | 7/2006 | German |
| 2006/0186926 A1 | 8/2006 | Yager |
| 2006/0251419 A1 | 11/2006 | Zadikian |
| 2007/0291535 A1 | 12/2007 | Eberle |
| 2008/0101229 A1 | 5/2008 | Meleis |
| 2009/0074414 A1 | 3/2009 | Miles |
| 2009/0226181 A1 | 9/2009 | Fingler |
| 2009/0245097 A1 | 10/2009 | Takakuwa |
| 2010/0098412 A1 | 4/2010 | Boyd |
| 2010/0211664 A1 | 4/2010 | Raza |
| 2010/0129078 A1 | 5/2010 | Weston-Dawkes |
| 2010/0142544 A1 | 6/2010 | Chapel |
| 2010/0211665 A1 | 8/2010 | Raza |
| 2010/0211697 A1 | 8/2010 | Raza |
| 2010/0215049 A1 | 8/2010 | Raza |
| 2010/0266117 A1 | 10/2010 | Enge |
| 2011/0092100 A1 | 4/2011 | Coffey |
| 2011/0116748 A1 | 5/2011 | Smrha |
| 2011/0188383 A1 | 8/2011 | Koziy |
| 2011/0228473 A1 | 9/2011 | Anderson |
| 2011/0255829 A1 | 10/2011 | Anderson |
| 2012/0008945 A1 | 1/2012 | Singla |
| 2012/0069839 A1 | 3/2012 | Kunz |
| 2012/0102217 A1 | 4/2012 | Cardona |
| 2012/0219005 A1 | 8/2012 | Durve |
| 2012/0243554 A1 | 9/2012 | Sybesma |
| 2012/0246362 A1 | 9/2012 | Anne |
| 2013/0148976 A1 | 6/2013 | Patel |
| 2013/0177309 A1 | 7/2013 | El-Ahmadi |
| 2013/0179622 A1 | 7/2013 | Pratt |
| 2013/0194005 A1 | 8/2013 | Voutilainen |
| 2014/0019662 A1 | 1/2014 | Coffey |
| 2014/0036920 A1 | 2/2014 | McCormick |
| 2014/0270762 A1 | 9/2014 | Li |
| 2014/0270764 A1 | 9/2014 | Decusatis |
| 2014/0317249 A1 | 10/2014 | Jankiraman |

OTHER PUBLICATIONS

Extended European Search Report mailed in corresponding EP application 15769183.3 dated Dec. 14, 2007.

International Search Report and Written Opinion mailed in PCT/US2015/052847 by ISA/US dated Jun. 30, 2016.

International Search Report and Written Opinion mailed in PCT/US2015/052924 by ISA/US dated Feb. 2, 2016.

International Search Report and Written Opinion mailed in PCT/US2016/026714 by ISA/US dated Jul. 12, 2016.

International Search Report and Written Opinion mailed in PCT/US2015/12795 by ISA/US dated May 18, 2015.

International Search Report and Written Opinion mailed in PCT/US2015/023077 by ISA/US dated Jul. 7, 2015.

International Search Report and Written Opinion mailed in PCT/US2015/039045 by ISA/US dated Oct. 2, 2015.

LHCB Online System Data Acquisition & Experiment Control, 2001, [retrieved on Sep. 4, 2015] http://lhcb-comp.web.cem.ch/lhcb-comp/Gemal/Publications/onlinedtr.pdf.

* cited by examiner

BUILT IN ALTERNATE LINKS WITHIN A SWITCH

CROSS-REFERENCE TO RELATED APPLICATIONS

This application is a continuation of application Ser. No. 14/671,263 filed on Mar. 27, 2015 (now U.S. Pat. No. 10,277,496), and claims benefit from U.S. Provisional Application Ser. No. 61/972,121, filed on Mar. 28, 2014 the contents of both are incorporated herein in their entirety by reference.

BACKGROUND

Field

The present disclosure relates generally to network switches typically used in data centers, and more particularly to network switches providing additional port capabilities that become active in the event of a failure occurring in a primary port, or that may be used for additional purposes.

Description of the Related Art

Current data network switch architectures have a finite number of ports 108 in the switching core, as seen in FIG. 1. This therefore means that a switch of a given size uses all its available ports for switching data between the ports (primary ports 108), leaving no active ports available to compensate in case of a primary port 108 failure. A network switch consists of a number of interface ports 108, switch logic 106, and a control processor 102. Some network switches may also have dedicated packet processors to perform routing and other functions. A network switch may also have a Management Interface Port 104 that enables the switch to communicate with Management Controller 100 that configures the settings within the Network Switch 10.

Each port 108 connects to Switch Logic 106 via data path 112. In operation, Switch Logic 106 receives data from a particular port 108 and transfers or switches the data to an outgoing port 108 as defined by configuration settings from the Management Controller 100. FIG. 2 shows more details of a connection between two ports 108 within the Switch Logic 106. The basic function of a Network Switch 10 consists of receiving a physical layer data stream on an input port 108, extracting the data, and then transmitting that data out as a physical layer data stream on an output port. The two main blocks for this process within the Network Switch are transceiver ports 108 to external medium 118 and Switch Logic 106 which in turn contains a number of functional blocks.

A port 108 consists of a transceiver 132 and a connector 130. The transceiver 132 has a receiver which receives the data from a remote end via external medium 118, and a transmitter which transmits the data to a remote end via an external medium 118. Examples of external mediums include wireless, Cat 6, Cat 6a, optical fiber, or other physical connection mediums. In a network switch, a port 108 receives a physical layer data signal from the external medium 118, which then converts the signal from the physical layer signal into an electrical data signal, separates the recovered timing information from physical layer signal, and clocks the data via connection 112 into a Serial/Deserializer 120 (SerDes) as a serial data stream. The SerDes 120 converts the serial data stream from the receiver into a parallel interface format for the next stage, a Media Access Control (MAC) layer 122. The MAC layer 122 is an interface between the Logical Link Control (LLC) sublayer and the network's physical layer and provides the Data Link Layer functions including the frame delimiting and identification, error checking, MAC addressing, and other functions. The frame delimiting and identification functions are the functions that locates packet boundaries and extracts the packets from the incoming data stream. The packet is parsed by the MAC layer 122 and the header fields are extracted and passed via interface bus 110 to the Central Processing Unit (CPU) 102, or a dedicated Packet Processor (not shown), which interprets the header information. In an Ethernet packet for example, the header contains the source MAC address, destination MAC address, and other information needed to determine the packet type and destination of the packet. The Network Switch 10 is configured by the Management Controller 100 which communicates with the Management Interface Port 104 via control path 101 to exchange information, such as configuration information, alarm information, status information. The Routing Tables 128 contain the information necessary to direct an incoming packet on a particular port 108 to an outgoing packet on a particular port 108. The Routing Tables 128 may be determined by discovery protocol software within the Network Switch 10, or the CPU 102 may receive configuration information from the Management Controller 100 to set up particular routing table configurations. CPU 102, or the dedicated packet processor, looks up the output destination route for the packet, modifies the outgoing header if necessary, then the Switch Fabric 124 transfers the packet to an outgoing queue in the MAC 122. The outgoing MAC layer 122 formats the outgoing packet for transmission and performs such functions as generating the frame check sequence for the outgoing packet. The completed packet is then fed to the outgoing SerDes 120, which converts the parallel data stream into a serial data stream. The serial data stream is fed to the outgoing transceiver port 108 which converts the data stream into a physical layer signal, adds in the physical layer timing and transmits the data signal out port 108 to external medium 118.

As seen in FIGS. 1 and 2, within current Network Switches 10, the number of SerDes 124, the number of MACs 122, the size of Routing Tables 128, the capability of the Switch Fabric 124, the CPU 102 processing power, the packet processing power, and/or some other design constraint results in the Network Switch being able to support only a finite number of ports 108.

Some network switches have dedicated standby ports, also called redundant ports, which can be used in the event of a primary port failure. Standby or redundant ports are intended to be manually configured for active use in the event of a failure in a primary port. A primary port failure can occur due to a failure in the switching core, physical port transceivers, or a link connecting the primary port to the remote end. In any of these primary port failure cases, the network loses a connection path (i.e., a link) and therefore loses the ability to transmit all data between two end points in the network, unless an alternate or redundant path is established. However, a network architecture that relies on redundant and/or standby ports to be enabled in case of a failure of a primary port necessitates that such redundant or standby ports remain idle and do not carry data until needed. As a result, network data traffic throughput is still limited to the maximum number of active ports capable of being supported by the Network Switch.

Other network architectures refrain from utilizing all the available bandwidth of a Network Switch, so that in the event of a failure of a link, other ports in the Network Switch will have sufficient capacity available to handle the additional load from the failed link. However, this results in each Network Switch operating at less than maximum bandwidth and requires additional Network Switches to support a full bandwidth capability.

A data center network architecture is generally considered a static configuration, such that once a data center network is built out, the main architecture does not change and there are relatively few changes are made to the data center network. This is because each architectural modification or change requires sending personnel to the data center to manually move components (or equipment) and/or to change interconnections between the components (or equipment) within the data center, or to reprogram equipment in the data center. Each architectural modification or change to the data center network incurs cost, sometimes significant cost, and increases the risk of errors in the new data center network architecture, and the risk of failures resulting from the architectural modification or change.

Because of these risks, in most cases architectural modifications or changes to a completed data center network is restricted wherever possible to only replacing failed components, minor upgrades to components, adding minor new features or capabilities, or adding a few new connections. Generally, with such architectural modifications or changes, there is little change to the core data flow in the data center network.

BRIEF SUMMARY OF THE INVENTION

The present disclosures provides network switches that can be incorporated into data center networks switch to simplify interconnection methodologies in the data center network, the components (or equipment) needed to maintain the data center network, and reduces the manpower required to maintain the data center network. The network switch according to one embodiment includes a set of ports, a switch logic unit, a data path interconnection unit, and a control unit. Each port within the set of ports is preferably configured to receive data from an external medium, and to transmit data to an external medium. The switch logic unit is capable of supporting a finite number of ports, wherein the number of ports in the set of ports is greater than the number of finite ports. The data path interconnection unit is connected to the set of ports by a set of port data paths and connected to the switch logic unit by a set of switch logic data paths, where the set of port data paths is equal to the number of ports in the set of ports, and the set of switch logic data paths is equal to the finite number of ports supported by the switch logic unit. The control unit is connected to the path interconnection unit and the switch logic unit, where the control unit is configured to control the switch logic unit to switch data on one switch logic data path to another switch logic data path, and wherein the control unit is configured to control the data path interconnection unit such that data on one switch logic data path is directed to one or more ports in the set of ports.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

Figure 1:
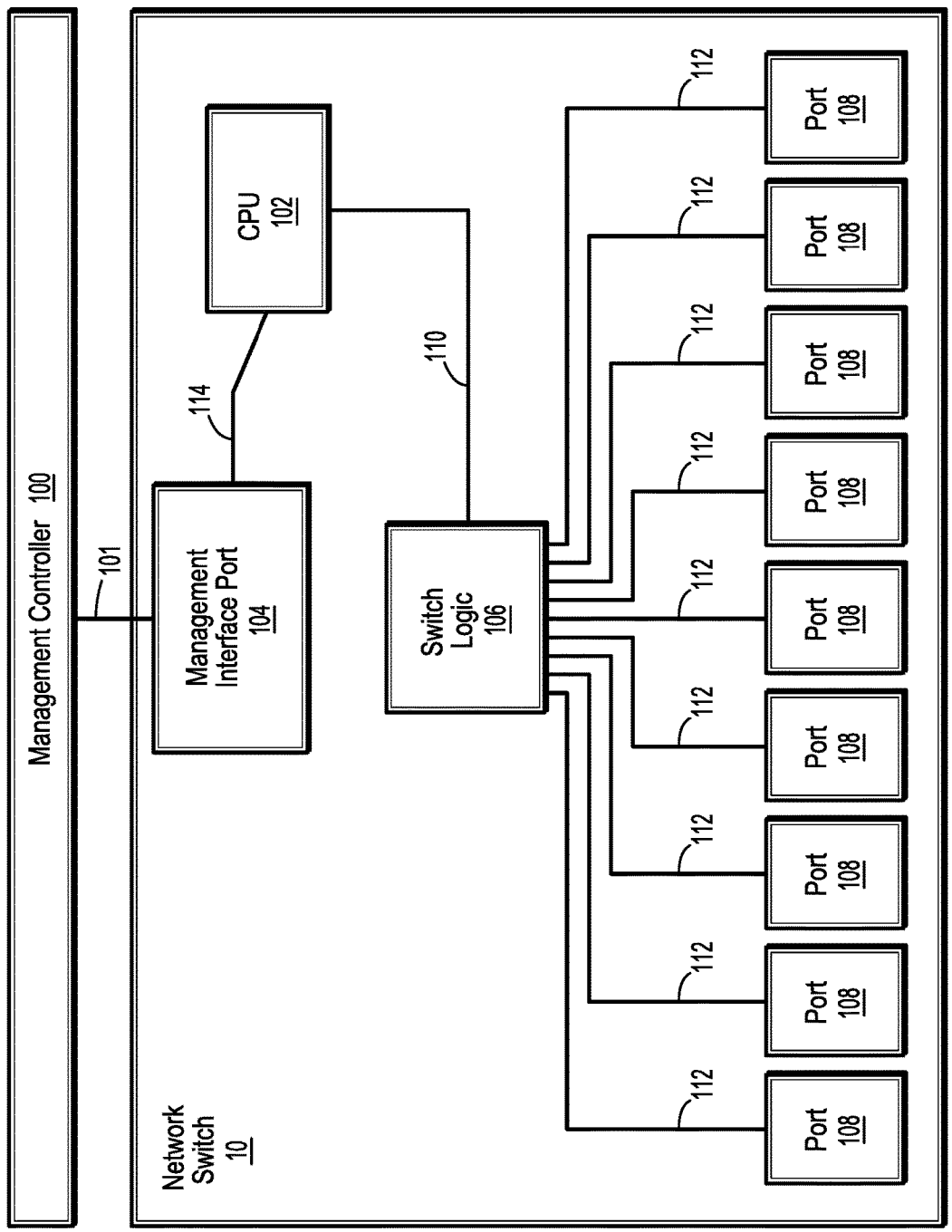
FIG. 1 is a block diagram of a current network switch architecture.
Figure 2:
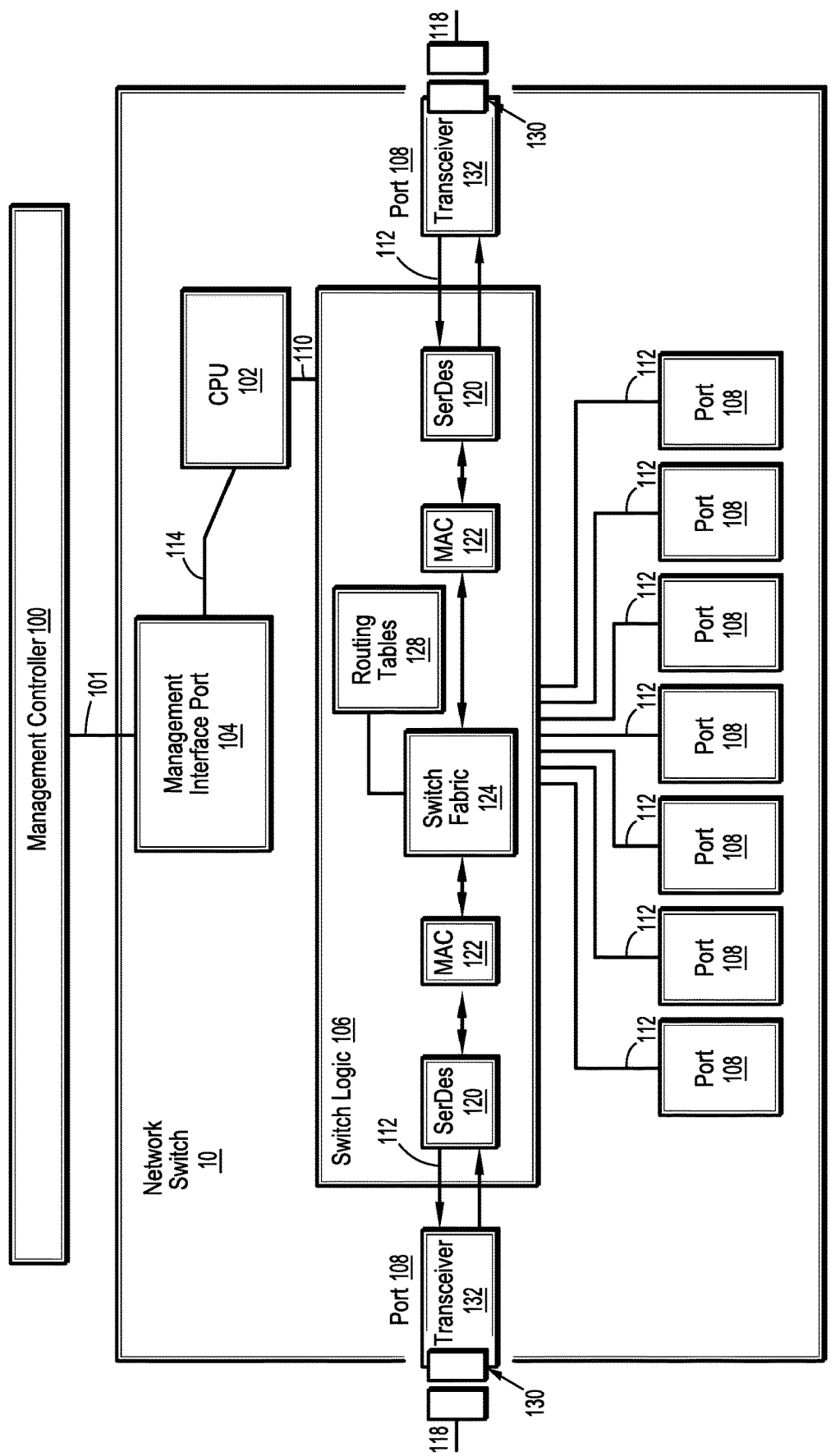
FIG. 2 is a block diagram of a current network switch architecture detailing the functions within the Switch Logic.
Figure 3:
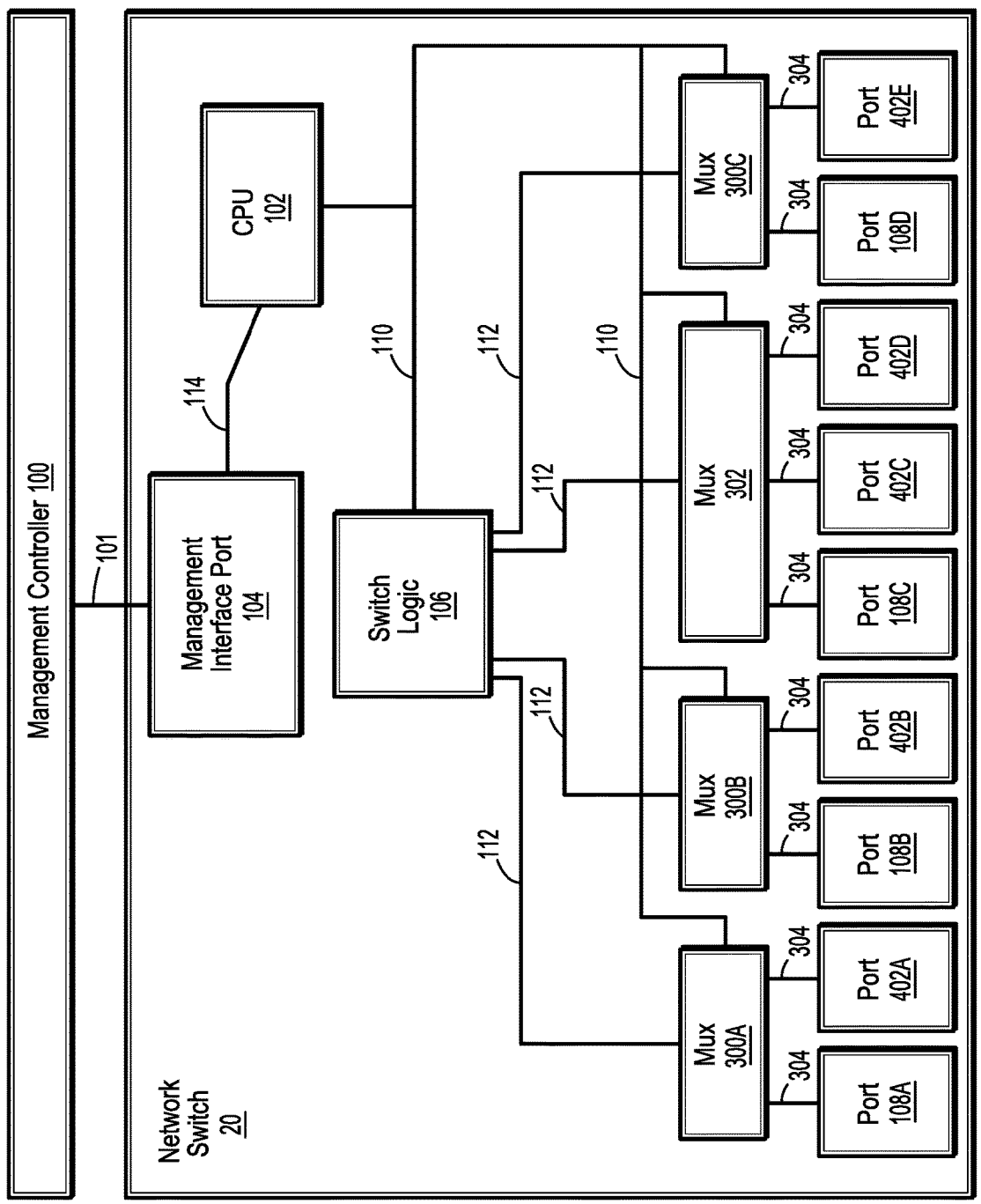
FIG. 3 is a block diagram of an exemplary embodiment of a network switch according to the present disclosure with multiplexor logic to select outgoing ports.

Referring to FIG. 3, an exemplary embodiment of a Network Switch according to the present disclosure is shown. In this embodiment, the Network Switch 20 includes CPU 102, Management Interface Port 104, Switch Logic 106, one or more multiplexers 300, 302, one or more primary ports 108, and one or more alternate ports 402. As noted above, each port 108, 402 includes a transceiver and a connector to connect to an external medium. The Network Switch 20 is configured so that the number of physical ports on the Network Switch 20 can be increased to support one or more alternate ports 402 while maintaining the same number of primary ports 108 on Switch Logic 106. In this embodiment, the data traffic on data path 112 from Switch Logic 106 can be switched by Multiplexor (MUX) 300 or 302 onto two or more physical output ports 108 or 402. In this embodiment, the electrical signals on data paths 112 from Switch Logic 106 are passed through MUX 300 or 302 which, under the control of CPU 102 (or dedicated hardware), selects a particular port or ports from the number of primary ports 108 or alternate ports 402 from which to transmit and receive data. For example, for a three port multiplexor 302, the CPU 102 can select any one of the three ports in which to transmit and receive the data traffic via data path 304. The port 108 or 402 selected by the MUX 300 or 302 connects to Switch Logic 106 via a data path 112. The Switch Logic receives data traffic from port 108 or 402 and transfers the data traffic to an outgoing port 108 or 402 as defined by the configuration settings from the CPU 102. As noted above, Management Controller 100 can provide the CPU with information to control the multiplexers 300, 302 and the Switch Logic 106 via the Management Interface Port 104. Further, the Routing Tables may also contain the information used to direct incoming packets on a particular port 108 or 402 to an outgoing packet on a particular port 108 or 402.

In the embodiment of FIG. 3, the Network Switch 20 has a plurality of primary ports 108 and alternate ports 402, each connected to Switch Logic 106 via an associated MUX 300 or 302 and data paths 112 and 304. Each MUX 300 or 302 may have two or more outputs that enable data traffic on data path 112 to be multiplexed to primary ports 108 or alternate ports 402. The multiplexers are controlled by CPU 102 via Control Bus 110 to select one or more of the paths 304 to connect to active port 108 or 402. Thus, using the multiplexers enables the Network Switch 20 to set many ports 108 or 402 as active. For example, the CPU 102 can automatically program the one or more multiplexers 300, 302 to switch the transmission path from a primary port 108 to the alternate port 402 in the case of a dual MUX 300, or in the case of a multiple port MUX 302 to one of the alternate ports 402. The Network Switch 20 can have as many standby or inactive ports as can be supported by the multiplexer logic. In a different embodiment, the multiplexor switchover may be performed by dedicated hardware instead of CPU 102.

In some embodiments, the alternate ports may be of the same type and speed rating as the primary ports. In other embodiments, the alternate ports may be of the different type and speed rating as the primary ports. For example, a primary port 108 may be implemented using a Cat 6a 10GE interface while the alternate port 402 might be a 10GE optical interface. In another example, a primary port 108 may be implemented using a 25GE optical interface while the alternate port 402 may be a Cat 6a 10GE interface. In the latter case, the bandwidth of the alternate port would limit the actual data rate of the data stream transmitted via the slower path.

In the case where the CPU 102 has switched from the primary port 108 to an alternate port 402, the CPU 102 can be instructed to automatically program the multiplexor 300 or 302 to switch the transmission path back from the active alternate port 402 to the primary port 108 via the Management Controller 100 and the Management Interface Port 104.

Figure 4:
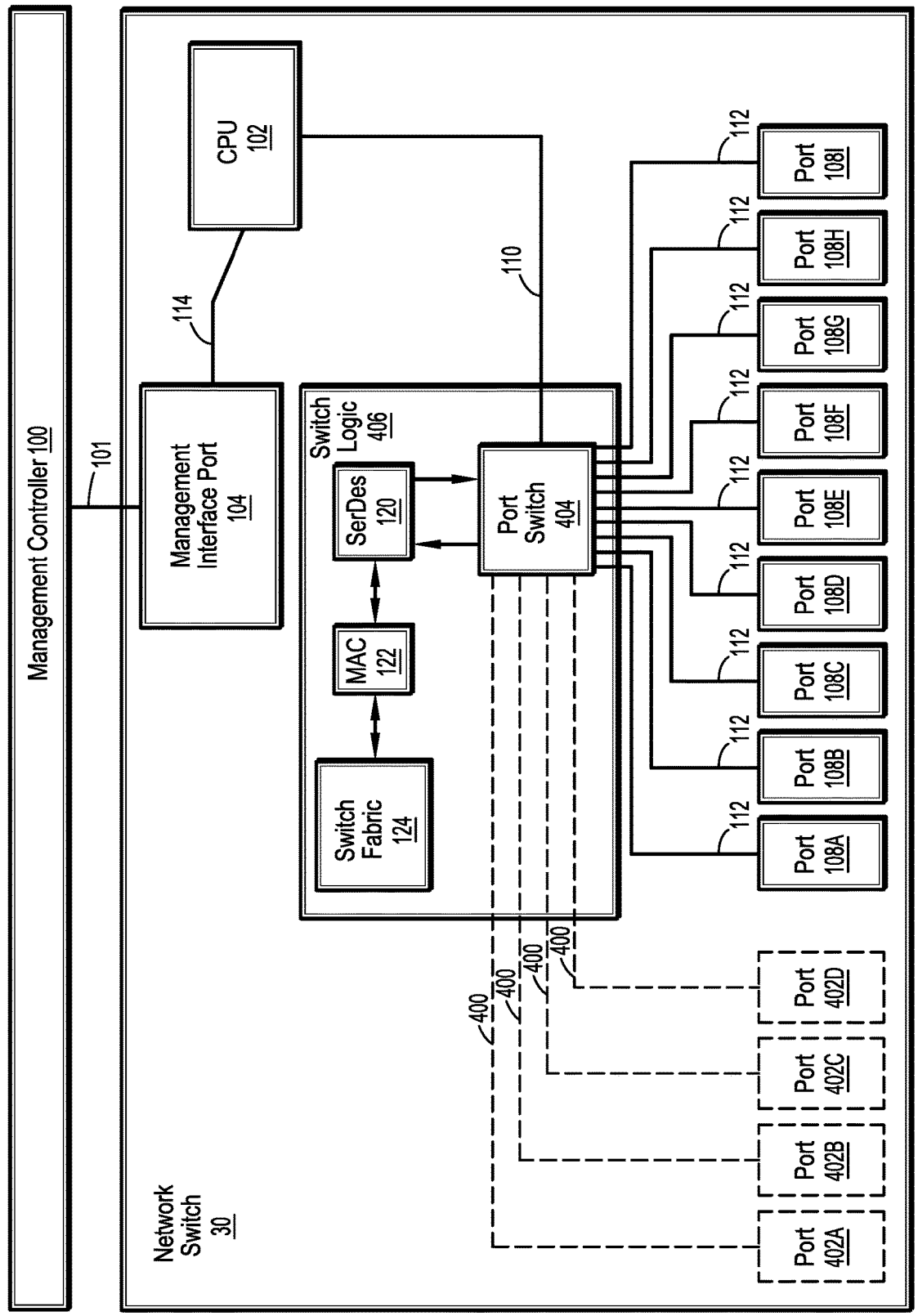
FIG. 4 is a block diagram of an exemplary embodiment of a network switch according to the present disclosure with alternate ports configurable to permit implementation of additional ports.

Referring now to FIG. 4, another exemplary embodiment of a Network Switch according to the present disclosure is shown. In this embodiment, the Network Switch 30 includes CPU 102, Management Interface Port 104, Switch Logic 406, one or more primary ports 108, and one or more alternate ports 402. As noted above, each port 108, 402 includes a transceiver and a connector to connect to an external medium. The Switch Logic 106 of this embodiment can support a greater number of primary ports 108 and alternate ports 402 than the number of Media Access Control (MAC) addresses available in Switch Logic 106. In this embodiment, the Switch Logic 406 contains a port switch 404 which, under the control of CPU 102 selects a particular port or ports 108 or 402 to feed into SerDes 120 and then into MAC 122. CPU 102, or the dedicated packet processor, looks up the output destination route for the packet, modifies the outgoing header if necessary, then the Switch Fabric 124 transfers the packet to an outgoing queue in the MAC 122. By consolidating the transceiver ports, switch fabric 124 can support all the data paths 112 and data paths 400, and the MACs 122 can be switched between the primary ports 108 and the alternate ports 402 to create a primary port 108 and alternate port 402 application. For example, if port 108A fails, the Network Switch 30 can enable port 402A as an active alternate port. In another embodiment, there may be a SerDes 120 associated with each port and the port switch 404 selects the output from all the SerDes 120 to feed into the MAC 122.

In other embodiments, Switch Logic 106 may have the capability of coupling multiple Switch Logic 106 units together using expansion ports (not shown) on Switch Logic 106. Such expansion ports can in some cases be repurposed to provide alternate ports 402 for switchover capabilities from the primary port 108. Depending upon the capabilities within Switch Logic 106 and the configuration of expansion ports, alternate ports 402 may potentially be set as additional primary ports or the alternate ports 402 may remain as alternate ports that can be configured by the CPU 102 as active ports in the event a primary port 108 is removed from an active state.

Figure 5:
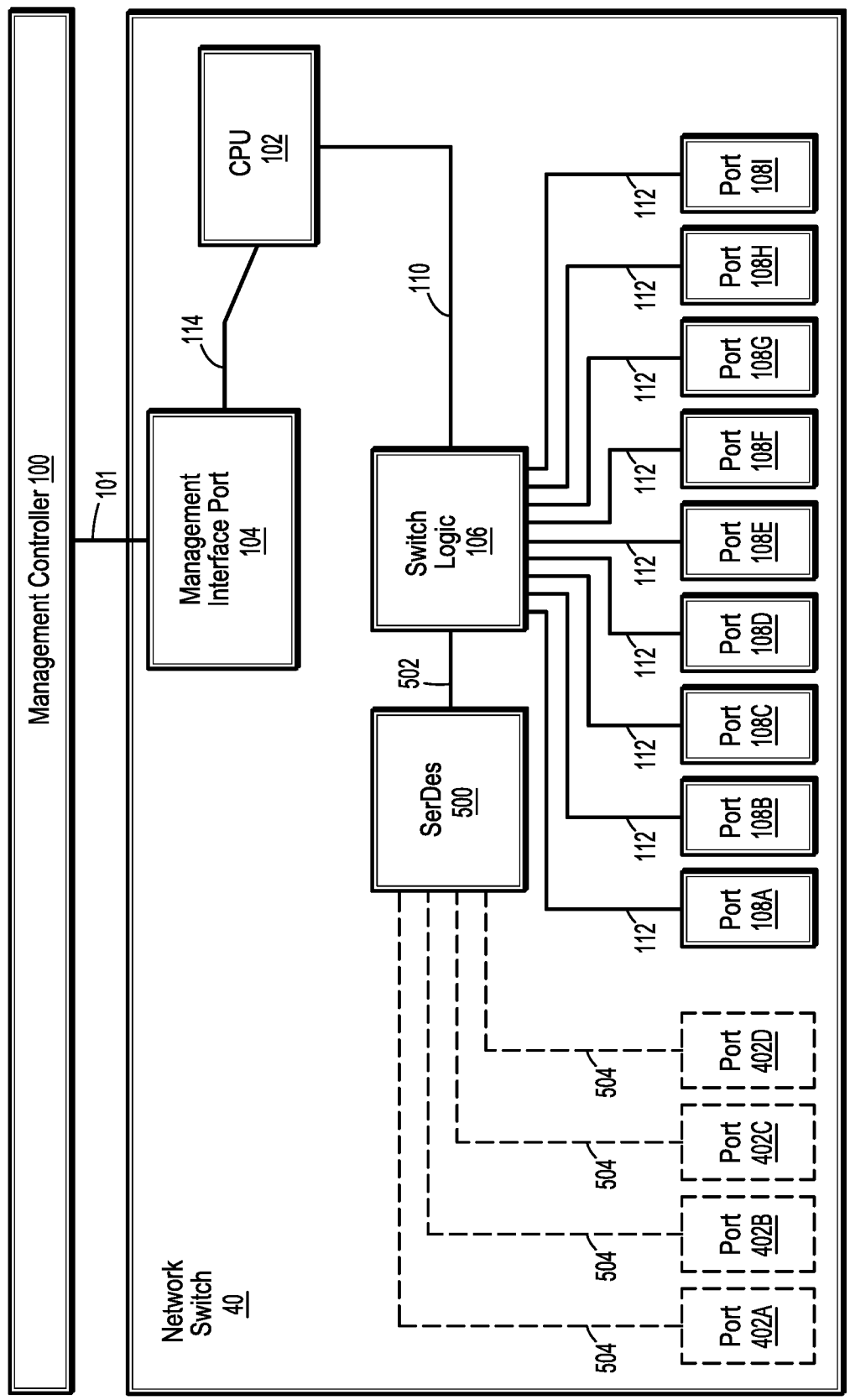
FIG. 5 is a block diagram of an exemplary embodiment of a network switch according to the present disclosure with alternate ports created by additional circuitry to permit implementation of additional ports.

Referring now to FIG. 5, another exemplary embodiment of a Network Switch according to the present disclosure is shown. In this embodiment, the Network Switch 40 includes CPU 102, Management Interface Port 104, Switch Logic 106, Serial/Deserializer (SerDes) 500, one or more primary ports 108 and one or more alternate ports 402. As noted above, each port 108, 402 includes a transceiver and a connector to connect to an external medium. By adding SerDes 500, which is external to the Switch Logic 106, the bandwidth of the Switch Logic 106 can be extended to support the alternate ports 402, while the Serial/Deserializer within the Switch Logic 106 supports the primary ports 108. The external SerDes 500 can be added into the Network Switch 40 and connected to the Switch Logic 106 via bus 502.

Figure 6:
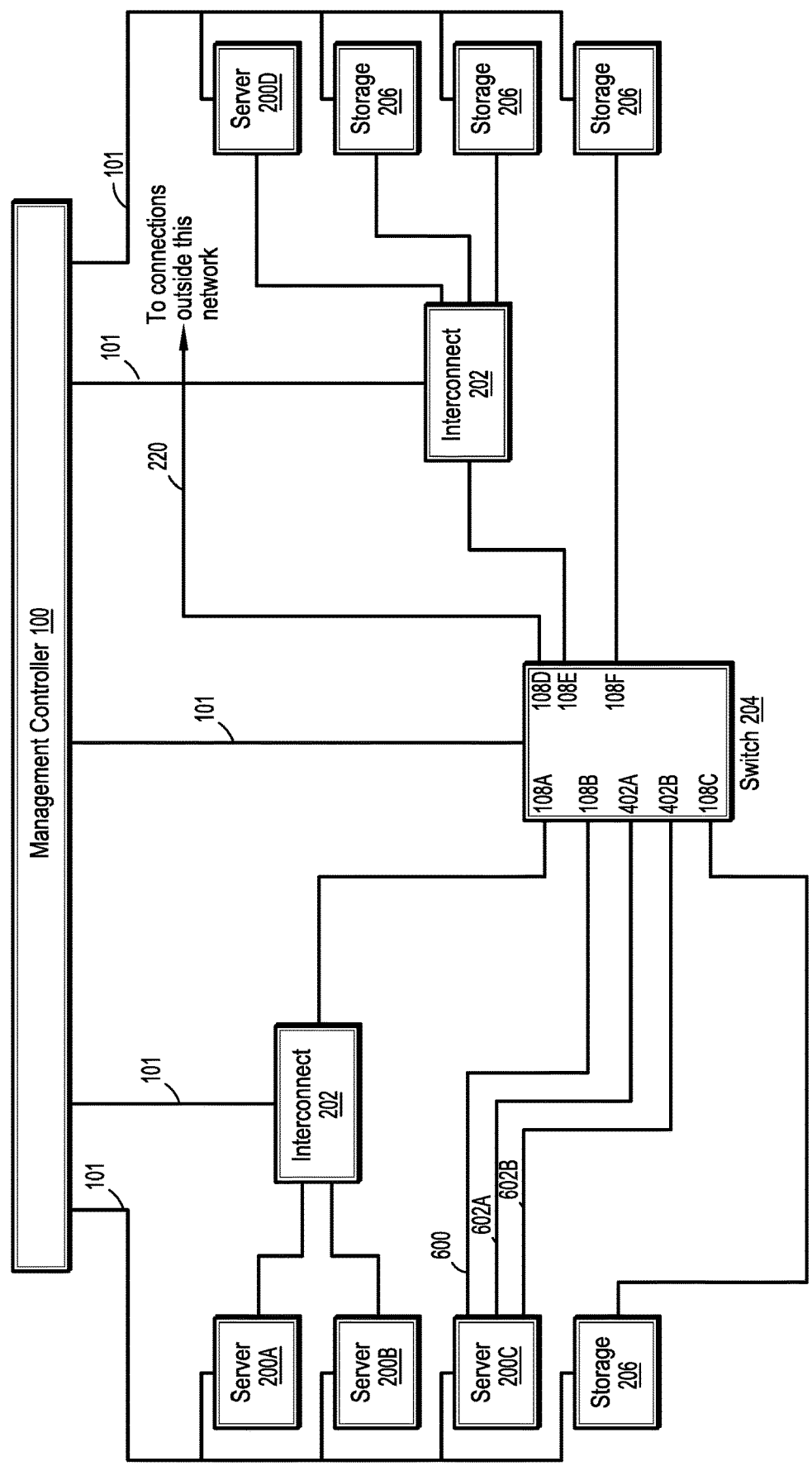
FIG. 6 is a block diagram of another exemplary embodiment of a network architecture according to the present disclosure with alternate ports configurable to permit parallel or bonded paths within the data center network.

In another embodiment, there exists additional physical ports for creating multiple paths to a single destination to form a larger bandwidth pipe. Referring to FIG. 6, ports 602A and 602B are paths originating in ports 402A and 402B and which connect Switch 204 to Server 200C. In a parallel path configuration, port 402A and/or port 402B can be set active such that along with port 108B, the ports can transmit and receive data traffic independent of each other.

In another embodiment, there exists additional physical ports for bonding multiple ports together to form a larger bandwidth pipe with a single logical path. Again, referring to FIG. 6, in a bonded configuration, port 402A and/or port 402B can be set active such that along with port 108B, the ports can be bonded. This implements a single data path between Switch 204 and Server 200C that is now the sum of the bandwidths of path 600, path 602A and/or path 602B. The network shall see these multiple paths instead as a single larger bandwidth connection.

It is noted that each of the primary ports 108, which are active from a switching core perspective, means that the primary ports 108 have both an active transmit path and an active receive path. The alternate ports 402 may be set as inactive ports where the alternate ports 402 are not transmitting or receiving data so that they can act as standby or redundant ports. For example, in the event of failure of a primary port 108, the CPU 102 can be instructed by the Management Controller 100 via Management Interface Port 104 to set a failed primary port 108 as inactive and to activate an alternate port 402 to function as a primary port. This alternate port 402 may connect to the same endpoint device as the failed primary port or may have a completely different route through the data center network to an entirely different endpoint. In the event the failed primary port is repaired or replaced, the CPU can then be instructed by the Management Controller 100 via Management Interface Port 104 to set the replaced or repaired primary port 108 back as active, and to set the alternate port 402 as inactive. As another example, in the event an alternate port 402 functioning as a primary port 108 fails, the CPU can then be instructed by the Management Controller 100 via Management Interface Port 104 to set another alternate port 402 active as a primary port, route data traffic to that alternate port 402, and set the failed alternate port to inactive.

It should be noted that for optical fiber applications, this implementation method does not use optical couplers, such that there is no loss of optical power from the input port to the output port.

While the active primary ports 108 and active alternate ports 402 will be capable of transmitting and receiving data, any standby primary port 108 and any standby alternate port 402 can be configured to maintain an active link status, such as Keep Alive signals to the remote end and monitoring for Loss of Signal (LOS) or other alarm and status indicators ensuring the path is available to enable to active use when required.

All ports 108 and 402 can be configured and monitored by CPU 102 to track the physical connection and maintain per port status for the Management Controller.

Reconfigurable Network

Figure 7:
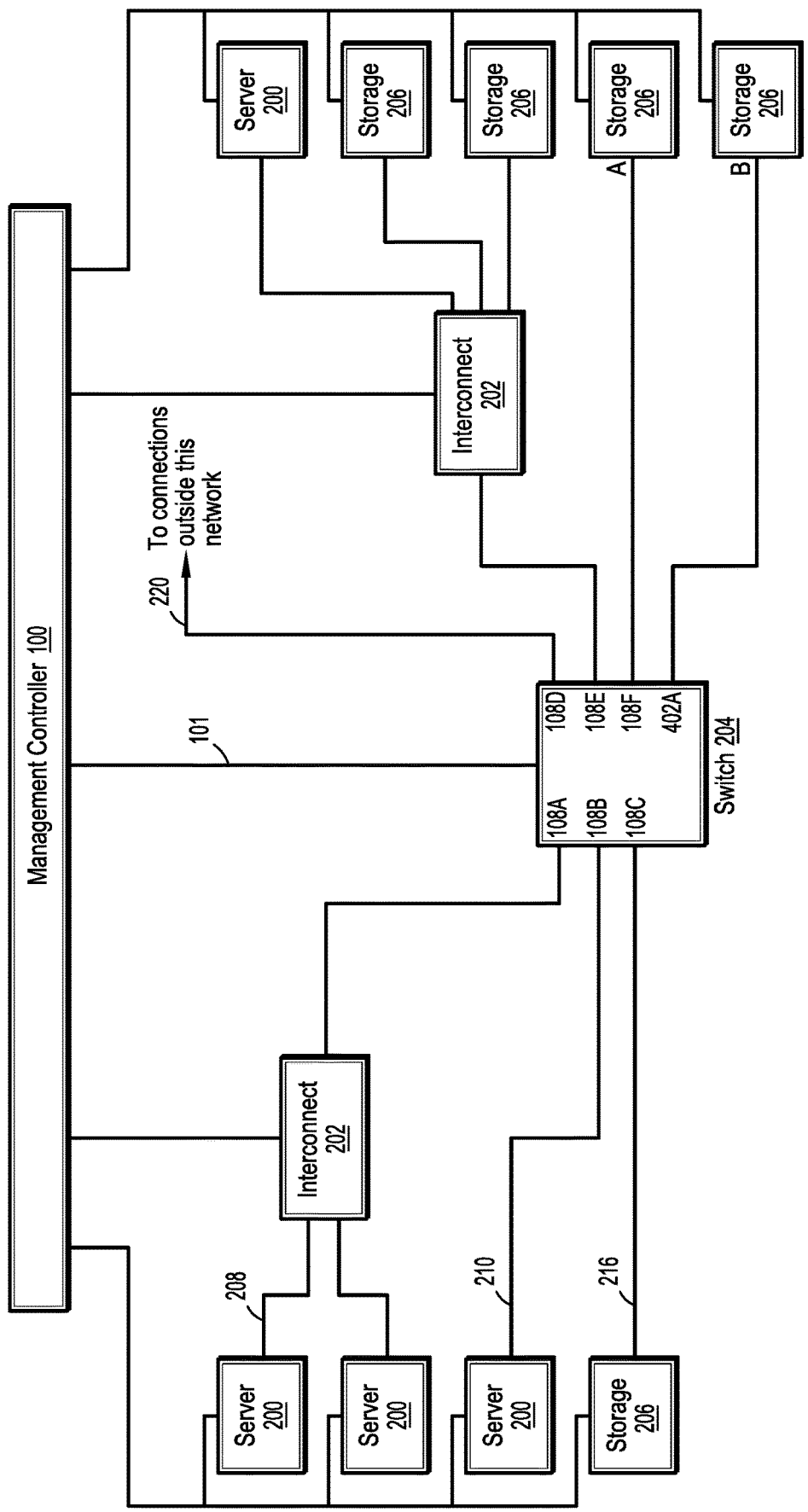
FIG. 7 is a block diagram of another exemplary embodiment of a network architecture according to the present disclosure with alternate ports configurable to permit automatic reconfiguring of the data center network.

The present disclosure also provides methods for automatically reconfiguring Network Switches in data center networks. FIG. 7 provides an exemplary embodiment of Network Switch 20, 30 or 40 (referred to in this section as Network Switch 204) according to the present disclosure incorporated into a data center network. In this embodiment, the capability exists to create a software controlled touchless reconfigurable network, as shown in FIG. 7, where the Management Control Software 100 can modify the routing tables of Switch 204 to create alternate routes within the network. This differs from a redundant path concept that provides an alternate path to the same endpoint or to the same endpoint application. In this case this implementation routes data traffic to new destinations or provides additional parallel paths to an existing destination to increase bandwidth on demand without the need for manual intervention. The proviso that the physical connections between the endpoints are pre-established. Once the physical connections have been made between the endpoints, a Management Controller 100 can reconfigure the network without requiring personnel to manually reconnect the interconnections.

An exemplary method for automatically reconfiguring a data center network that has been previously constructed with known physical connections between the various network devices commonly deployed with a data center network, such as servers 200, storage devices 206, interconnects 202, and one or more Network Switches 204 of the present disclosure. The discovery of the logical and physical interconnections between the network devices, and the discovery of the end to end path and interconnections between devices is achieved through the Management Controller 100 using known network discovery tools, such as exchanging conventional network discovery data packets, such as address resolution protocol (ARP) packets, broadcast, and multicast packets between all the network devices (or links) within the data center network. The Management Controller 100 can exchange conventional network discovery data packets with each network device through data paths 101 to discover the network topology. Through the discovery process, the Network Switch 204 Routing Tables can be created by the Management Controller 100 and used by the Network Switch 204 to route data traffic to endpoint destinations within the data center network, and to destinations outside the data center network. With a known data center network configuration, the Management Controller 100 can then monitor data traffic within the data center network.

Figure 8:
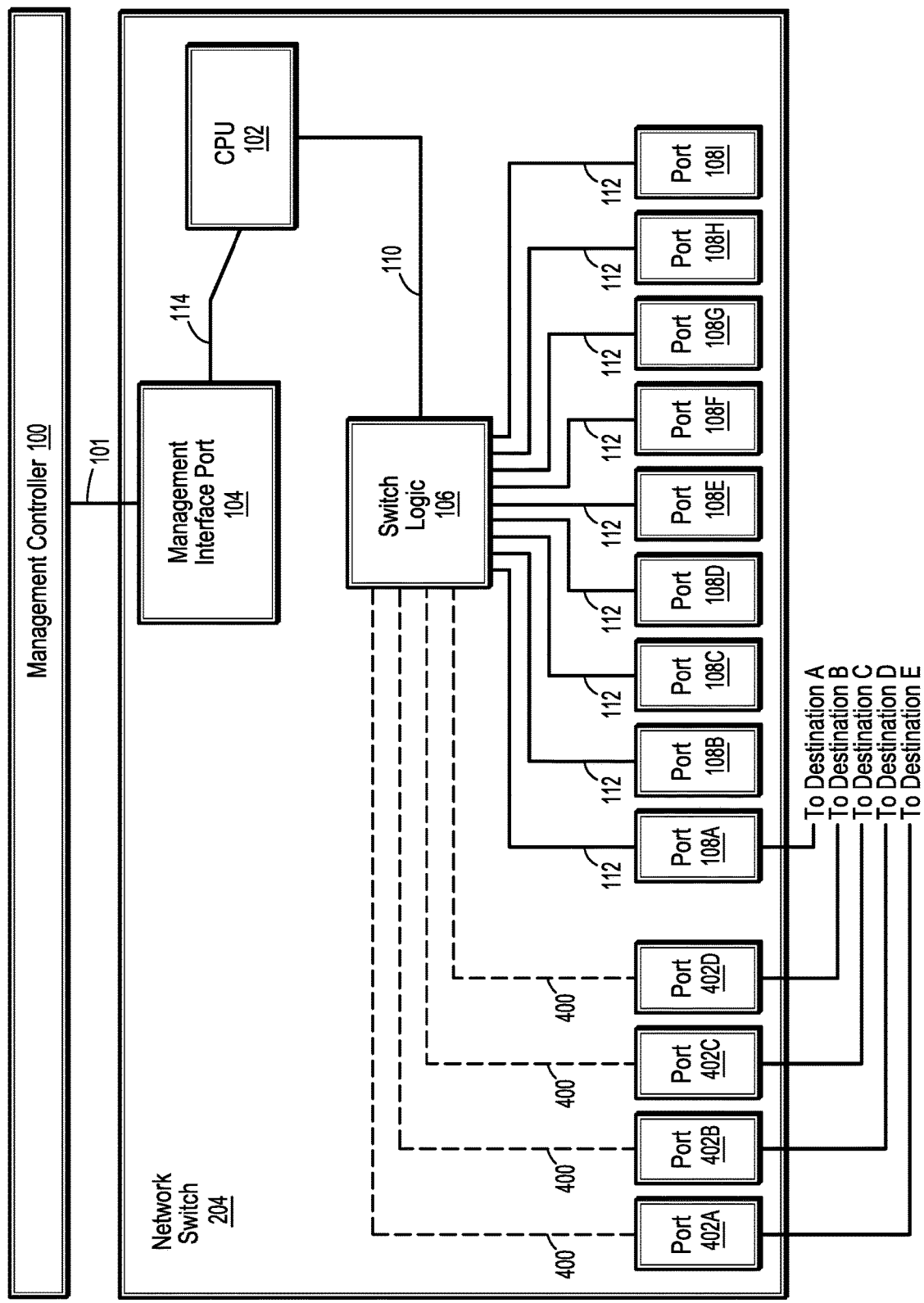
FIG. 8 is a block diagram of another exemplary embodiment of a network switch according to the present disclosure with alternate destination connections.

The exemplary data center architecture using the Network Switch architectures according to the present disclosure provides a data center network implementation that can use the primary ports and/or alternate ports to automatically reconfigure the data center network. Referring again to FIG. 7, the Network Switch 204 has the capacity to support additional ports as described above. The Management Controller 100 can automatically instruct the CPU 102 in the Network Switch 204 to set either one or more primary ports 108 and/or one or more alternate ports 402 as active to transmit and receive data in the data center network. By setting up these additional routes, data traffic can be switched from one path, e.g., to destination "A", to a different path, e.g., to destination "B", (seen in FIG. 7) permitting data to be sent to different endpoints. Referring to FIG. 8, the Network Switch 204 has been configured to set alternate ports 402A-402D as primary ports that are connected to endpoint destinations A-E within the data center network. To configure the Network Switch 204 in this way, the Management Controller 100 can instruct the CPU 102 in the Network Switch 204 to set alternate ports 402A-402D as active primary ports to transmit and receive data in the data center network. By setting up these additional routes, data traffic can be switched from one path, e.g., to destination "A", to a different path, e.g., to destination "E", (seen in FIG. 8) permitting data to be sent to different endpoints.

Figure 9:
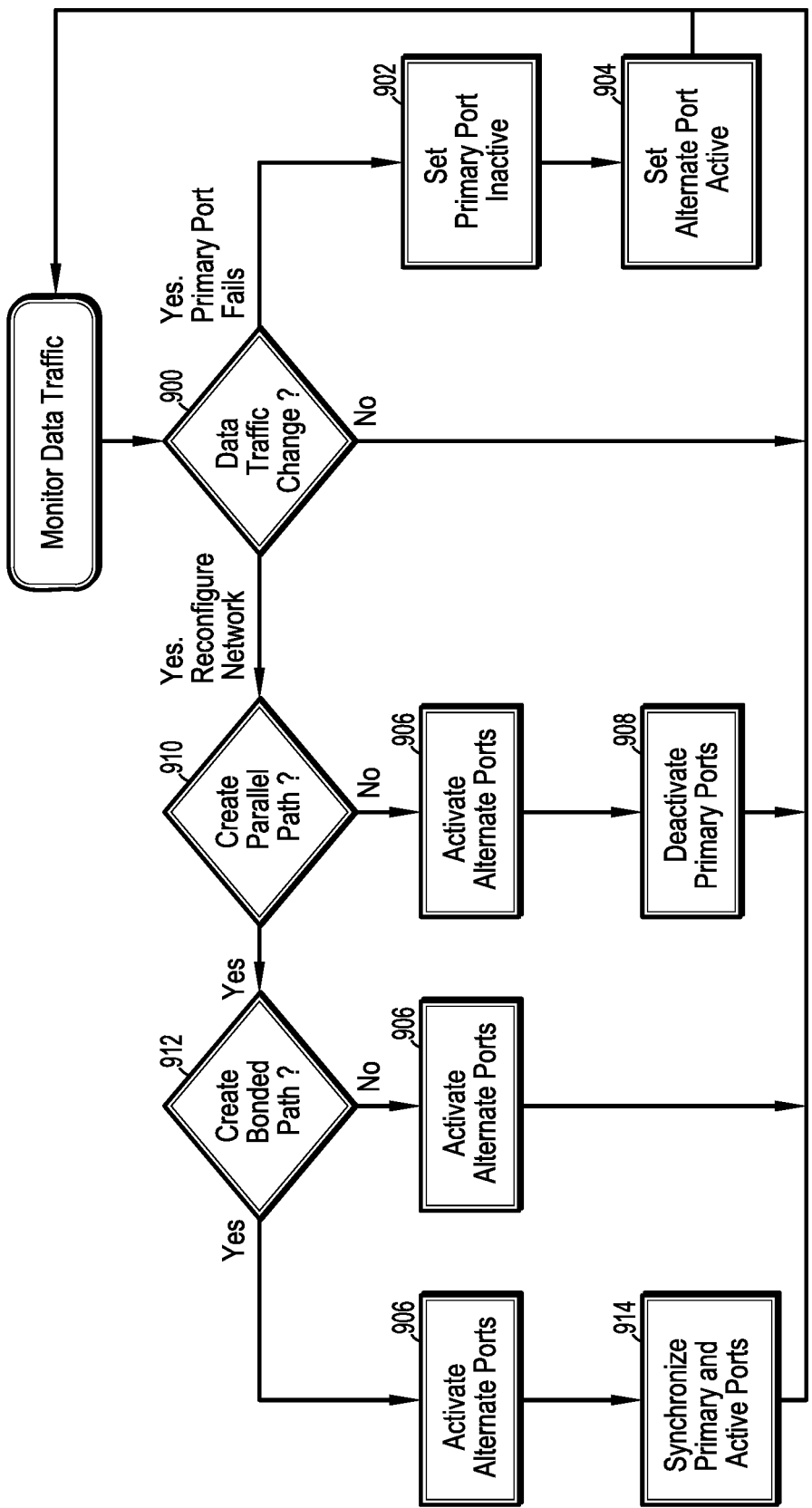
FIG. 9 is a flow diagram for a method for automatically reconfiguring a data center network according to the present disclosure.

Referring to FIG. 9, as the Management Controller 100 monitors the data traffic within the data center network it determines if the data traffic has changed such that an alternate port should be activated, or the network is to be reconfigured (at step 900). If the Management Controller detects that a primary port 108 has failed, the Management Controller 100 instructs the Network Switch 204 to set the failed primary port 108 inactive (at step 902) and set an alternate port 402 active so that the alternate port takes over as a primary port to transmit and receive data traffic (at step 904). If the Management Controller 100 detects that the network should be reconfigured to, for example, connect the switch to a different endpoint on particular link, the Management Controller 100 instructs the Network Switch 204 to set one or more alternate ports 402 active (at step 906), and set an one or more primary ports 108 inactive so that the alternate port takes over as a primary port to transmit and receive data traffic to different endpoints (at step 908). If the Management Controller 100 detects that the network should be reconfigured to, for example, address additional bandwidth needed on particular link, the Management Controller 100 instructs the Network Switch 204 to create a parallel path (at step 910) by setting one or more alternate ports 402 active (at step 906), so that data traffic can be transmitted and received across the multiple paths in parallel to the same endpoint. If the Management Controller 100 detects that the network should be reconfigured to, for example, address additional bandwidth with a single logical connection needed on particular link, the Management Controller 100 instructs the Network Switch 204 to create a bonded path (at step 912) by setting one or more alternate ports 402 active (at step 906), and then synchronize the primary ports 108 to the alternate port such that data traffic can be transmitted and received across the multiple paths in parallel as a single data path to the same endpoint (at step 914).

Network Switch with Built in Test/Monitoring Ports

Figure 10:
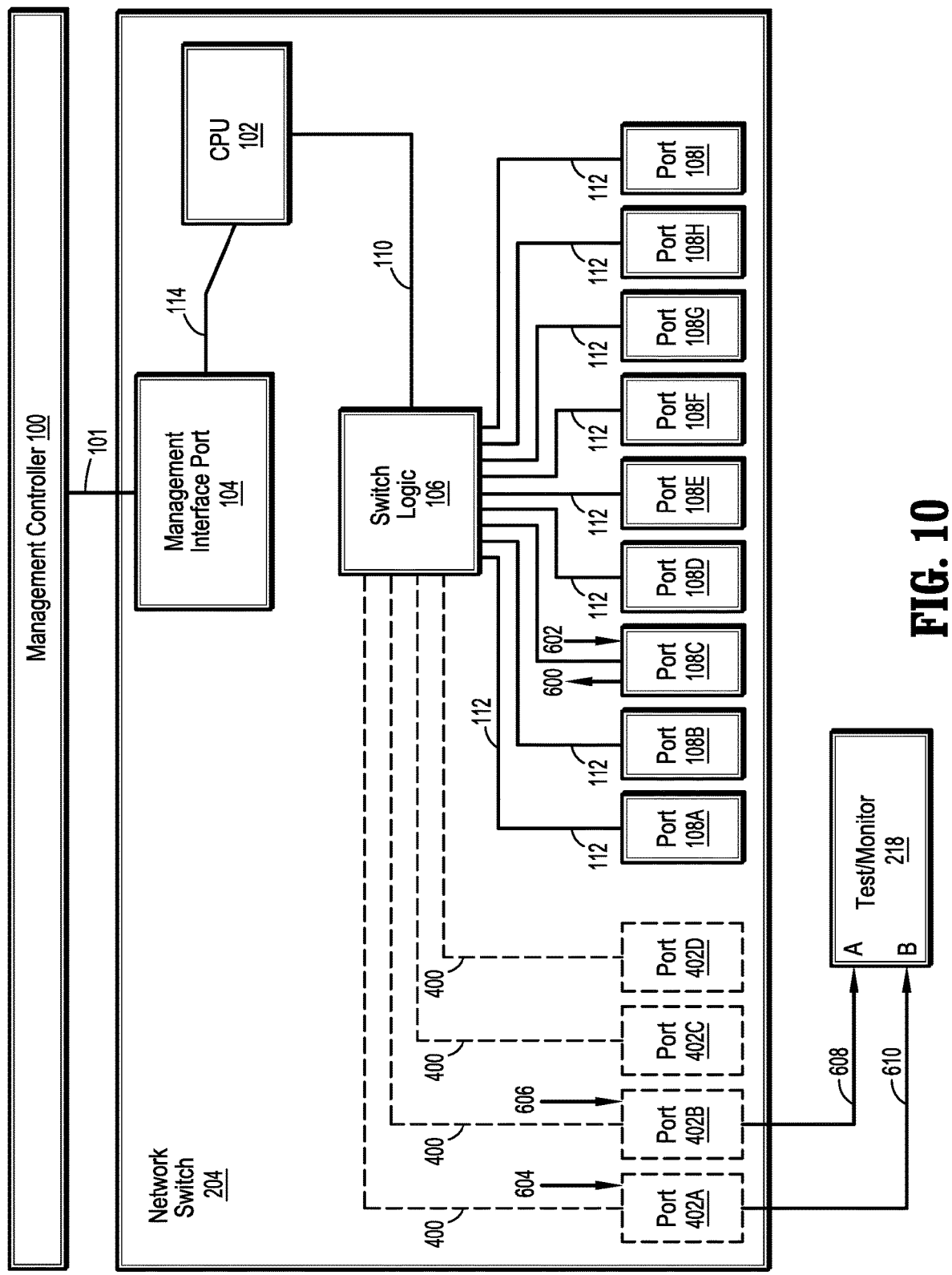
FIG. 10 is a block diagram of another exemplary embodiment of a network switch according to the present disclosure with alternate ports configurable to permit additional ports to be utilized as Test/Monitor ports.
Figure 11:
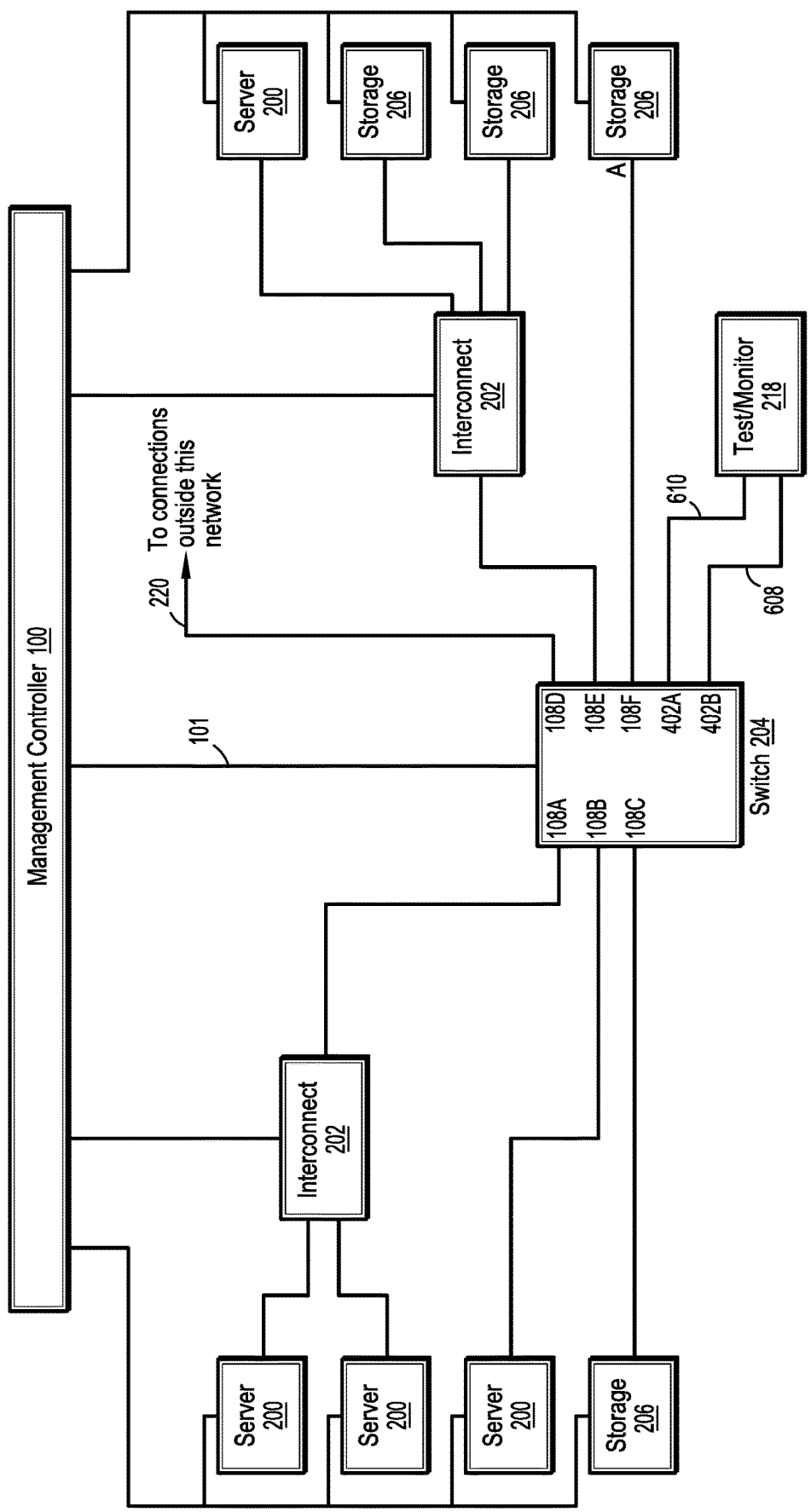
FIG. 11 is a block diagram of another exemplary embodiment of a network architecture according to the present disclosure with alternate ports configured as Test/Monitor ports connected to a Test/Monitor platform.

The present disclosure also provides methods for automatically incorporating a Test/Monitoring platform into a communication path in data center networks. FIG. 10 provides an exemplary embodiment of Network Switch 20, 30 or 40 (referred to in this section as Network Switch 204) according to the present disclosure that supports incorporating a Test/Monitoring platform into a communication path of a data center network. FIG. 11 provides an exemplary embodiment of a data center network with a Network Switch 204 that incorporates the Test/Monitoring platform into a communication path of the data center network. Generally, the Network Switch 204 permits the creation of multiple network paths in parallel which can pull data traffic directly off the Network Switch 204 and forward the transmit and receive data traffic to Test/Monitor platform 218, with zero latency added to the original communication path. In this exemplary embodiment, the Management Controller 100 can instruct the CPU 102 of the Network Switch 204 to couple the transmit and receive paths of data traffic associated with a primary port 108 to alternate ports which are connected to Test/Monitor Platform 218 within the data center network. As a result, the Network Switch 204 according to the present disclosure removes the need to manually move path connections for test and monitoring purposes or modifying the packet headers.

As an example, the Network Switch 204 architecture according to this embodiment creates three paths associated with one primary port 108, e.g., primary port 108C. In this exemplary embodiment, data traffic on primary port 108C can be routed by Switch Logic 106 to any other primary port or alternate port set active as part of communication path, and the data traffic on primary port 108C is to be tested/monitored. To test/monitor data traffic on primary port 108C, the Management Controller 100 can instruct CPU 102 of Network Switch 204 to create two Test/Monitor port paths 604 and 606, which are based on the primary receive communication path 600 and transmit communication path 602 of port 108C. While maintaining the primary communication path between the primary port 108C and any other primary port, the Switch Logic also couples the receive communication path 600 to transmit communication path 604 connected to alternate port 402A, and couples the transmit communication path 602 to transmit communication path 606 connected to alternate port 402B. The alternate ports 402A and 402B are connected to the Test/Monitor platform 218 via communication paths 608 and 610. This configuration creates a test connection bridge which duplicates the original point to point path onto three separate paths: the original path from source to destination, the test monitor path from the source to the destination mirrored over to the test connection port A, and the monitor path from the destination to the source return path mirrored over to the test connection port B while adding zero latency to the original path. Thus, no physical connections need to be moved, nor do headers need to be modified such that a data center network monitoring architecture the path connections can be passed unmodified to the Test/Monitor platform 218.

It should be noted while the embodiment described above shows communications from primary port 108C being routed to alternate ports 402A and 402B, any primary port 108 can be mapped to the transmit communication path 604 and 606 on any alternate port 402 which can then be connected to input ports on Test/Monitor platform 218. In addition, rather than switching both the receive communication path 600 and transmit communication path 602 from a primary port 108 to one or more alternate ports 402 for test/monitoring purposes, the Switch Logic 106 may be instructed by the Management Controller 100 to only switch receive communication path 600 or transmit communication path 602 to one alternate port 402. In another embodiment, rather than switch all the data traffic from the primary port 108 to the alternate path 402, Switch Logic 106 may be instructed by Management Controller 100 to switch only certain types of data or packets based on defined criteria sent by the Management Controller 100 to the CPU 102 of the Network Switch 204.

The resulting architecture therefore permits dedicated test monitoring paths to be built into the switch without requiring physically moving network connections or introducing latency into the network.

It should be noted that for optical fiber applications, this implementation method does not use optical couplers, such that there is no loss of optical power from the input port to the output port.

As will be appreciated by one skilled in the art, aspects of the present disclosure may be embodied as a system, method or computer program. Accordingly, aspects of the present invention may take the form of an entirely hardware embodiment, an entirely software embodiment (including firmware, resident software, micro-code, etc.) or an embodiment combining software and hardware aspects that may all generally be referred to herein as a system. Furthermore, aspects of the present disclosure may take the form of a computer program product embodied in one or more computer readable medium(s) having computer readable program code embodied thereon.

Computer program code for carrying out operations for aspects of the present invention may be written in any combination of one or more programming languages, including an object oriented programming language such as Java, Smalltalk, C++ or the like, and conventional procedural programming languages, such as the "C" programming language or similar programming languages.

Aspects of the present invention are described above with reference to flowchart illustrations and/or block diagrams of methods, systems and computer programs according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be understood that various modifications can be made to the embodiments of the present disclosure without departing from the spirit and scope thereof. Therefore, the above description should not be construed as limiting the disclosure, but merely as embodiments thereof. Those skilled in the art will envision other modifications within the scope and spirit of the invention as defined by the claims appended hereto.

What is claimed is:

1. A data center switch, comprising:
   a set of primary ports, wherein each port within the set of primary ports includes a transceiver and a connector to connect with an external data transmission medium;
   a set of alternate ports, wherein each port within the set of alternate ports includes a transceiver and a connector to connect with an external data transmission medium;
   a switch logic unit configured to interface with a finite number of ports, wherein the number of ports in the set of primary ports plus the number of ports in the set of alternate ports is greater than the number of finite ports;
   a data path interconnection unit physically connected to the set of primary ports and the set of alternate ports by a set of port data paths and physically connected to the switch logic unit by a set of switch logic data paths, wherein the number of port data paths in the set of port data paths is equal to the number of primary ports plus the number of alternate ports, and wherein the number of switch logic data paths in the set of switch logic data paths is equal to the finite number of ports interfacing with the switch logic unit; and
   a control unit operatively connected to the path interconnection unit and the switch logic unit; wherein the control unit is configured to control the switch logic unit to switch data on one switch logic data path to another switch logic data path, wherein the control unit is configured to control the data path interconnection unit so that either a primary port or an alternate port is set to an active state, such that:
      data received at the active primary or alternate port and transferred to one or more port data paths is directed to one switch logic data path; or
      data on one switch logic data path is directed to one or more port data paths and transmitted by one or more active ports; and
   wherein the control unit is configured to control the switch logic unit to control the data path interconnection unit so that a second alternate port is set active, such that data received at the active primary or alternate port and transferred to one or more port data paths is directed to the second alternate port.

2. The data center switch according to claim 1, further comprising one or more media access control layers, wherein the active second alternate port is enabled by the one or more media access control layers.

3. The data center switch according to claim 1, further comprising one or more serial/deserializer blocks, wherein the active second alternate port is enabled by the one or more serial/deserializer blocks.

4. The data center switch according to claim 1, wherein multiple active ports in the set of primary ports and the set of alternate ports are configured to transmit and receive in parallel over multiple paths to a single end destination.

5. The data center switch according to claim 1, wherein multiple active ports in the set of primary ports and the set of alternate ports are configured to transmit and receive in parallel over multiple paths configured as a single bonded path to a single end destination.

6. The data center switch according to claim 1, wherein an active port in the set of primary ports or an active port in the set of alternate ports is configured to receive data from an external medium of a first medium type, wherein the receive data passes through the switch logic unit, wherein the switch logic converts the received data into a format for transmission onto a second data medium type, and wherein the converted data passes through a port data path to another active port in the set of primary ports or another port in the set of alternate ports capable of transmitting data onto an external medium of the second data medium type.

7. The data center switch according to claim 6, wherein the first medium type comprises an electrical medium type or an optical medium type.

8. The data center switch according to claim 6, wherein the second medium type comprises an electrical medium type or an optical medium type.

9. A data center switch, comprising:
   a set of primary ports, wherein each port within the set of primary ports includes a transceiver and a connector to connect with an external data transmission medium;
   a set of alternate ports, wherein each port within the set of alternate ports includes a transceiver and a connector to connect with an external data transmission medium;
   a switch logic unit physically connected to the set of primary ports and the set of alternate ports by a set of primary port data paths and a set of alternate port data paths; and
   a control unit operatively connected to the switch logic unit;
   wherein the control unit is configured to control the switch logic unit to switch data on one primary or alternate data path to another primary or alternate data path;
   wherein the control unit is configured to control the switch logic unit so that either a primary port or an alternate port can be set to an active state, such that data received at the active primary port or the active alternate port and transferred to one or more primary or alternate port data paths is directed to one or more different primary or alternate port data paths; and
   wherein the control unit is configured to control the switch logic unit so that a second alternate port can be set active, such that data received at the active primary port or the active alternate port and transferred to one or more port data paths is also directed to the active second alternate port.

10. The data center switch according to claim 9, further comprising one or more media access control layers, wherein the active second alternate port is enabled by the one or more media access control layers.

11. The data center switch according to claim 9, further comprising one or more serial/deserializer blocks, wherein the active second alternate port is enabled by the one or more serial/deserializer blocks.

12. The data center switch according to claim 9, wherein multiple ports in the set of primary ports and the set of alternate ports are configured to transmit and receive in parallel over multiple paths to a single end destination.

13. The data center switch according to claim 9, wherein multiple ports in the set of primary ports and the set of alternate ports are configured to transmit and receive in parallel over multiple data paths configured as a single bonded path to a single end destination.

14. The data center switch according to claim 9, wherein an active port in the set of primary ports or an active port in the set of alternate ports is configured to receive data from an external medium of a first medium type, wherein the receive data passes through the switch logic unit, wherein the switch logic converts the received data into a format for transmission onto a second data medium type, and wherein the converted data passes through a port data path to another active port in the set of primary ports or another active port in the set of alternate ports capable of transmitting data onto an external medium of the second data medium type.

15. The data center switch according to claim 14, wherein the first medium type comprises an electrical medium type or an optical medium type.

16. The data center switch according to claim 14, wherein the second medium type comprises an electrical medium type or an optical medium type.

17. A data center switch, comprising:
   a set of primary ports, wherein each port within the set of primary ports includes a transceiver and a connector to connect with an external data transmission medium;
   a set of alternate ports, wherein each port within the set of alternate ports includes a transceiver and a connector to connect with an external data transmission medium;
   a switch logic unit physically connected to the set of primary ports and the set of alternate ports by a set of primary port data paths and a set of alternate port data paths; and
   a control unit operatively connected to the switch logic unit;
   wherein the control unit is configured to control the switch logic unit to switch data on one primary or alternate data path to another primary or alternate data path;
   wherein the control unit is configured to control the switch logic unit so that either a primary port or an alternate port can be set to an active state, such that data received at the active primary port or the active alternate port and transferred to one or more primary or alternate port data paths is directed to one or more different primary or alternate port data paths; and
   wherein the control unit is configured to control the switch logic unit so that predefined information can be exchanged between the data center switch and a remote device through an active primary port or an active alternate port.

18. The data center switch according to claim 17, wherein the predefined information comprises control information, command information and status information.

19. A data center switch, comprising:
   a set of primary ports, wherein each port within the set of primary ports includes a transceiver and a connector to connect with an external data transmission medium;
   a set of alternate ports, wherein each port within the set of alternate ports includes a transceiver and a connector to connect with an external data transmission medium;
   a switch logic unit physically connected to the set of primary ports and the set of alternate ports by a set of primary port data paths and a set of alternate port data paths; and
   a control unit operatively connected to the switch logic unit;
   wherein the control unit is configured to control the switch logic unit to switch data on one primary or alternate data path to another primary or alternate data path;
   wherein the control unit is configured to control the switch logic unit so that either a primary port or an alternate port can be set to an active state, such that data received at the active primary port or the active alternate port and transferred to one or more primary or alternate port data paths is directed to one or more different primary or alternate port data paths; and
   wherein the control unit is configured to control the switch logic unit so that multiple ports in the set of primary ports and the set of alternate ports can be configured to transmit and receive in parallel over multiple paths configured as a single bonded path.

* * * * *